US012812746B2

(12) United States Patent
Chaimberg et al.

(10) Patent No.: US 12,812,746 B2
(45) Date of Patent: Nov. 24, 2026

(54) MULTI-FUNCTION, ELECTRICAL RECEPTACLE MOUNTED, LED LIGHT CONTROL MODULE FOR UNDERCABINET LIGHTING SYSTEMS

(71) Applicant: GLOBE ELECTRIC COMPANY INC., Montreal (CA)

(72) Inventors: Adam Chaimberg, Hampstead (CA); Jay Allard, Laval (CA); Bo Tong, Montreal (CA); Xi Xiao Che, Montreal (CA); John Oliveros, Gray, GA (US); Xiong Xianwen, HangZhou (CN)

(73) Assignee: GLOBE ELECTRIC COMPANY INC., Montreal (CA)

( * ) Notice: Subject to any disclaimer, the term of this patent is extended or adjusted under 35 U.S.C. 154(b) by 84 days.

(21) Appl. No.: 19/058,946

(22) Filed: Feb. 20, 2025

(65) Prior Publication Data

US 2025/0267771 A1 Aug. 21, 2025

Related U.S. Application Data

(60) Provisional application No. 63/555,655, filed on Feb. 20, 2024.

(51) Int. Cl.
*H05B 45/20* (2020.01)
*F21V 23/00* (2015.01)
(Continued)

(52) U.S. Cl.
CPC ........... *H05B 45/20* (2020.01); *F21V 23/008* (2013.01); *F21V 23/045* (2013.01); *H05B 45/10* (2020.01);
(Continued)

(58) Field of Classification Search
CPC .... H05B 47/19; H05B 45/20; H05B 47/1965; H05B 45/10; H05B 47/11; H05B 47/105;
(Continued)

(56) References Cited

U.S. PATENT DOCUMENTS 9,004,717 B2 4/2015 Ratkus et al.
10,371,331 B1 * 8/2019 Kosta ...................... F21S 8/035
(Continued)

*Primary Examiner* — Wei (Victor) Y Chan
(74) *Attorney, Agent, or Firm* — Gray Ice Higdon

(57) ABSTRACT

A multi-function, electrical outlet mounted, LED light control command module provides for the control of at least two sets of color LED's of different known color, such as RGB color LED's or white color LED's mounted in a lighting unit which may be mounted, for example, under a cabinet. The control command module is mounted in an electrical outlet receptacle on a wall in close proximity to the lighting unit cabinet. The control command module is provided with manual switches to switch the LED light unit on/off and for controlling the light intensity of the resultant light. The switches also provide for the selection of a desired white light CCT color temperature and the selection of a desired colored light. Another switch provides brightness control of the resultant light selected by the user person. The control command module also has a communication module connecting port adapted to optionally receive one of two communication modules to permit remote control of the light control command module within the RF frequency range or remotely by smart electronics wireless devices.

30 Claims, 4 Drawing Sheets

(51) Int. Cl.

| | |
|---|---|
| ***F21V 23/04*** | (2006.01) |
| ***F21Y 115/10*** | (2016.01) |
| ***H05B 45/10*** | (2020.01) |
| ***H05B 47/155*** | (2020.01) |
| ***H05B 47/165*** | (2020.01) |
| ***H05B 47/175*** | (2020.01) |
| ***H05B 47/19*** | (2020.01) |

(52) U.S. Cl.
CPC ......... *H05B 47/155* (2020.01); *H05B 47/165* (2020.01); *H05B 47/19* (2020.01); *H05B 47/1965* (2024.01); *F21Y 2115/10* (2016.08)

(58) Field of Classification Search
CPC .. H05B 47/115; H05B 47/125; H05B 47/195; H05B 47/1985; H05B 47/197
See application file for complete search history.

(56) References Cited

U.S. PATENT DOCUMENTS

| | | | | |
|---|---|---|---|---|
| 10,539,309 | B2 | 1/2020 | Danville et al. | |
| 10,753,561 | B2 * | 8/2020 | Chien | F21S 8/035 |
| 10,893,587 | B2 | 1/2021 | Halliwell | |
| 10,966,306 | B1 * | 3/2021 | Recker | H02J 13/13 |
| 11,147,136 | B1 | 10/2021 | Igo et al. | |
| 11,564,302 | B2 | 1/2023 | Igo et al. | |
| 11,602,026 | B2 | 3/2023 | Igo et al. | |
| 11,906,114 | B2 | 2/2024 | Halliwell | |
| 2015/0091454 | A1 * | 4/2015 | McRae | H05B 47/19 315/200 R |
| 2018/0317293 | A1 | 11/2018 | Chen | |
| 2021/0063007 | A1 * | 3/2021 | Khalifa | A01G 7/045 |
| 2023/0036482 | A1 * | 2/2023 | Altonen | H01H 15/025 |
| 2023/0189413 | A1 | 6/2023 | Igo et al. | |

* cited by examiner

MULTI-FUNCTION, ELECTRICAL RECEPTACLE MOUNTED, LED LIGHT CONTROL MODULE FOR UNDERCABINET LIGHTING SYSTEMS

FIELD OF THE INVENTION

The present invention relates to LED lighting and more particularly, but not exclusively, to undercabinet mounted LED lighting which is powered by an electrical connection to an electrical receptacle usually mounted in a wall close to tan LED lighting unit and specifically to a multi-function control command module mounted to the electrical receptacle and provided with function switches to operate various light features of an LED lighting unit.

BACKGROUND OF THE INVENTION

Under cabinet mounted LED or fluorescent light fixtures are conveniently supplied electrical voltage by an electrical cord connected to an electrical outlet mounted in close proximity to the light fixture and wherein the electrical cord is visible to the eye. The on/off switch for the light fixture, with such installations, is usually mounted on the fixture housing and can be difficult to locate due to the fact that the light fixture is concealed under a cabinet. Reference is made to U.S. Pat. Nos. 9,004,717 and 10,539,309 as well as US Patent Publication 2018/0317293 as examples of such under cabinet lighting assemblies. Modules, such as transformers, controls to switch the light fixture on/off are mounted in the cable leading to the light fixtures and are disposed on a counter top or attached to the wall close to the light fixture or to the bottom wall of the cabinet, if space is available, not to be seen. Also, such fixtures usually project a white light over a working surface to provide visibility on the surface area. It is also well known to adjust the intensity of the light by the use of a dimmer switch with the control knob usually mounted on the light housing or a separate unit attached to the cable.

It would be desirable to conceal the various devices associated with such concealed light fixtures, such as the switch control, the transformers, the dimmer control and other devices connected to the power supply cable or the housing and to simplify the assembly and installation thereof. It would also be desirable to provide such an assembly in a kit form to permit easy installation thereof by a user person without the need of an electrician. Still further, it would also be desirable to project light from a concealed light fixture or fixtures onto a working surface or other type areas and wherein the light can be modified to produce a desired light effect by the use of LED's of different colors as well as white light and wherein all of the electrical connections and components and controls are not visible to the eye, except for the electrical cable plug mounted in the electrical outlet. It would further be desirable for a user person to be able to a select and adjust the color of the projected light and the tone of white light produced by a single lighting unit or serially connected lighting units containing different sets of white and colored LED's. It would still further be desirable to use RGB LED's operable to produce a multitude of different colors. It would also be desirable to produce a desired colored light environment by mixing colors or modifying the tone and brightness of white light, to produce a light effect which is warm, cozy, relaxing or bright such as is desirable over a kitchen counter top or during dinning or working late over a desk top or in front of a computer or simply creating a bright environment over any area. Projecting colored light would make it possible to also create a festive mood such as projecting a red light effect during the Christmas time or other such festive occasions.

It would also be desirable to create a selected colored light environment by a single control device which could be mounted in the electrical outlet and operated manually by simple controls and which could be adapted to be additionally controlled remotely while maintaining the manually operable feature.

It is known, that different color temperatures will create different environments, such as when the color temperature is below 3000K, the white light has a different red tone or shade, giving people a warm and stable feeling. Suitable for household use, and which renders objects more colorful, is a color temperature higher than 5000K wherein the light color is blue, giving a sense of refreshment. Studies have shown that lower color temperatures can make people more likely to enter a resting state, while higher color temperatures can improve people's concentration.

It is also known that with RGB LED's, which are lamps in which are mounted three separate LED's to produce red, green and blue light, and wherein each LED can be configured by operating its drive current at different intensities to produce a resultant colored light. It is also known that by combining any of these three colors one can produce almost any color. Still further, combining red, green and blue light in equal amounts produces white light.

It is further known to use dimmer switches to adjust brightness of LED light sources. Dimmer switches are generally based on the principle of the use of silicon control rectifier chopper circuits. By adjusting the control button of the dimmer switch, the silicon control rectifier dimmer changes the energy transmitted to the LED, and its brightness output changes. Such dimmer controls have been integrated into the on/off switch of the LED light fixture.

SUMMARY OF THE INVENTION

It is therefore a feature of the present invention to provide a multi-function, electrical outlet mounted, LED light control command module which provides all of the above mentioned desirable features and overcomes prior art problems as mentioned herein above.

Another feature of the present invention is to provide a single light control command module which incorporates electrical connections for coupling to an electrical receptacle, a microcontroller circuit to drive selected sets of LED's of different color temperatures, and white light LED's and manual light control switches to select and modify the color temperature of white light and to select a desired colored light from LED's mounted in the lighting unit and which module would provide brightness adjustments to the selected light.

Another feature of the present invention is to provide a multi-function, electrical outlet mounted, light control command module, which when mounted in an electrical outlet, maintains the use of the electrical outlet for connection thereto by other electrical devices while permitting control of LED's mounted in a lighting unit.

Another feature of the present invention is to provide a multi-function, electrical outlet mounted, LED light control command module which is compact and eye pleasing and interconnects to a concealed under-cabinet lighting unit provided with color LED's of different colors and white light LED's through the use of a single small cable.

A further feature of the present invention is to provide a multi-function, electrical outlet mounted, LED light control command module for the control of one or more lighting units and which permits a user person to modify the color temperature of white light and permits selection of a colored light and further provides for the adjustment of the brightness of the resultant white light or colored light and wherein the lighting unit can be mounted under cabinets, in bookshelves, in walk-in closets, home offices, laundry rooms, just o mention a few of its additional applications.

Another feature of the present invention is to provide a multi-function, electrical outlet mounted, LED light control command module having a segmented switch assembly on a front face thereof for ease of operation by a user person to operate sets of LED's of different color or white LED's mounted in an associated lighting unit and which permits the user person to modify the light from a standard white light to full spectrum colored light to change the mood of a lit area to suit special occasions, such as for holiday decor, parties, etc.

A further feature of the present invention is to provide a multi-function, electrical outlet mounted, LED light control command module having manual controls mounted thereon for operation by the fingers of a user person and wherein the control module has a communication component connecting port to receive a communication module to permit remote control of the control command module by the use of a control device.

Another feature of the present invention is to provide a multi-function, electrical outlet mountable, LED light control command module which can be controlled from anywhere to power the control command module on/off, control different lighting sets and create a custom light environment or to automate the lighting units based on daily routine by the use of a smart phone in which is downloaded an app to permit such remote control Another feature of the present invention is to provide an under-cabinet light kit which permits a user person to select various control options and lighting unit to suit its budget and wherein the lighting unit is made ultra slim and designed to ensure even light distribution with no gaps to provide smooth task lighting and avoid eye strain.

A still further feature of the present invention is to provide a multi-function, electrical outlet mounted, LED light control command module which incorporates manual finger operable switches to switch color LED's on/off, select individual color LED's, adjust the intensity of the selected color LED's as well as selecting a further switch to provide white light with adjustment within predetermined color temperatures and to adjust the brightness thereof.

Another feature of the present invention is to provide an under-cabinet light kit comprised of a multi-function, electrical outlet mounted, LED light control command module and a flat lighting unit comprised of color LED's of at least two different colors and white light LED's and a single cable to interconnect the lighting unit to the control command module, and which kit is easy to install and wherein the light generated by the LED's mounted in the flat light unit can be modified by the use of manual control function switches provided on the front face of the control command module when secured to an electrical receptacle.

A further feature of the present invention is to provide an under-cabinet light kit which is inexpensive, easy to install, does not require wiring by a user person or electrician, and which can be easily expanded and further provides plug-in communication options which are simple to install and which can provide for remote control and/or smart device control and further wherein the remote control device can operate more than one control command module and their associated lighting units.

A still further feature of the present invention is to provide a multi-function, electrical outlet mounted, LED light control command module having controls mounted thereon for manual operation by the fingers of a user person and wherein the control command module has a communication component connecting port in a side wall thereof to receive a communication component to permit remote control and/or smart control of the LED lighting unit connected to the control command module, without having to change the control command module, and further wherein the opposed side wall of the command module is provided with one or two 120 VAC electrical receptacles and a USB port to permit connection to other electrical devices.

According to the above features, from a broad aspect, the present invention provides a multi-function, electrical receptacle mounted, LED light control command module which is comprised of a housing having electrical connectors in a rear wall thereof for mounting support of the control command module in an electrical receptacle to connect the control command module to a supply voltage to provide voltage to circuitry and components mounted is the housing. An electrical cable interconnects the control command module to an LED lighting unit having white LED's to produce white light and colored LED's to produce colored light. The circuitry includes a microcontroller to operate drivers to supply drive current to the LED's. The control command module is provided with switches mounted thereon to permit a user person to perform switch functions. These functions comprise:

(i) a first "on/off" switch to connect the supply voltage from the electrical receptacle to the circuitry and components including the microcontroller to operate the LED's in the LED lighting unit;

(ii) a second switch to adjust the brightness of light generated by the LED's;

(iii) a third switch to select white light LED's to generate a white light of a desired tone, and (iv) a fourth switch to select LED's producing a desired colored light, and wherein the second switch is operable to adjust the brightness of a resultant light produced by the selected white or colored light LED's.

According to another broad aspect of the present invention there is provided an under-cabinet light kit comprising a multi-function, electrical receptacle mountable, LED light control command module, as defined in the previous paragraph, in combination with one or more inter-connectable lighting units, and optionally one of a remote communication module having a remote control device, and a smart communication module adapted to be controlled through an application downloaded in a smart control wireless device.

According to another broad aspect of the present invention there is provided a method of controlling an LED lighting unit provided with white and colored LED's to illuminate an area and wherein the white and colored LED's are independently selected and controlled to adjust the color temperature of the white light and a desired color produced by color LED's and to adjust the intensity of a resultant selected light to create a desired lit environment. The method comprises the steps of:

i) providing a multi-function, electrical receptacle mountable, LED light control command module having function switches mounted thereon to permit control of the LED's mounted in the lighting unit. The control command module has electrical connectors for mounting in an electrical receptacle;

ii) mounting the lighting unit at a location to illuminate an adjacent area;

iii) mounting the control command module in an accessible electrical receptacle in proximity to the lighting unit;

iv) operating an "on/off" switch of the function switches to connect the control command module to electrical power from the electrical receptacle to feed supply voltage to circuitry including a microcontroller mounted in the control command module;

v) operating a white light or a colored light function switch to produce white light of a desired tone or colored light of a desired color, and vi) operating a brightness adjustment selection switch to adjust the intensity of a resultant white light or a selected colored light.

BRIEF DESCRIPTION OF THE DRAWINGS

A preferred embodiment of the present invention will now be described with reference to the accompanying drawings in which.

DETAIL DESCRIPTION OF THE INVENTION

Figure 1:
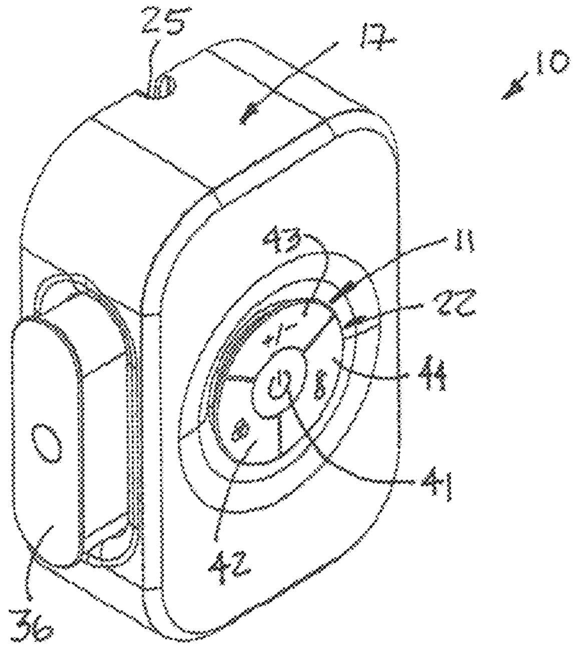
FIG. 1 is a perspective view of the multi-function, electrical outlet mountable, LED light control command module of the invention.
Figure 2:
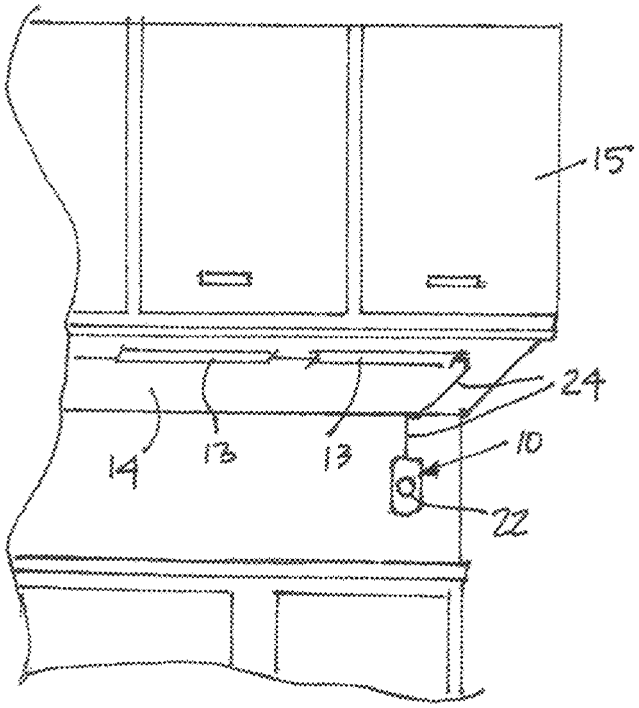
FIG. 2 is a perspective view illustrating an application of the multi-function, electrical outlet mountable, LED light control command module shown connected to a wall electrical outlet and through a single cable connected to two or more LED lighting units which are mounted under cabinets to project light on a counter top there under.
Figure 3:
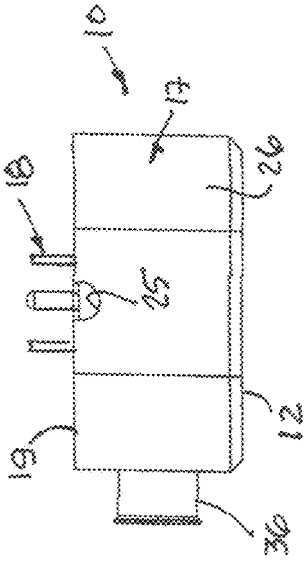
FIG. 3 is a top view of the light control command module of FIG. 1.

Referring now to the drawings, and particularly to FIGS. 1 and 2, there is shown generally at 10 the multi-function, electrical outlet mounted, LED light control command module of the present invention. The light control module 10 is provided with manual switches 11, which perform specific functions, and which are mounted on a front face 12 of the housing 17 for ease of access by a user person whereby to control the light generated by one or more LED lighting units 13, such as shown in FIG. 2, mounted on the outer surface 14' of the bottom wall 14 of cabinets 15. Many of these cabinets are fitted with a drop front moldings 16 secured along the bottom front edge of the cabinets to conceal the bottom wall 14 and convenient to conceal the lighting units 13. It is pointed out that the under-cabinet light control feature illustrated herein is only an example of the use of the light control command module and associated lighting units and several other uses are contemplated, such as for controlling an LED light fixture over a work spaces, book cabinets, kitchen cooking appliance, under tables and even under vehicles such as a parked motor coach to create a warm or festive outside environment at night, just to mention a few additional uses.

Referring additionally to FIGS. 3 to 7 and 12, the housing 17 of the light control module 10 is provided with a 3-prong male electrical connector 18 projecting from a rear wall 19 of the housing for mounting support and electrical connection of the control module housing 17 into a wall mounted electrical receptacle, not shown, but obvious to a person skilled in the art. The electrical connector 18 supplies voltage to electrical and electronics components 20, including a microcontroller, mounted on a printed circuit board (PCB) 21 secured in the housing 17. The microcontroller operates driver circuits, which are well known in the art, to provide operating current to the LED's and has commanded by the switch functions set by a user person to achieve desired light output from the associated lighting unit(s) 23.

Figure 11:
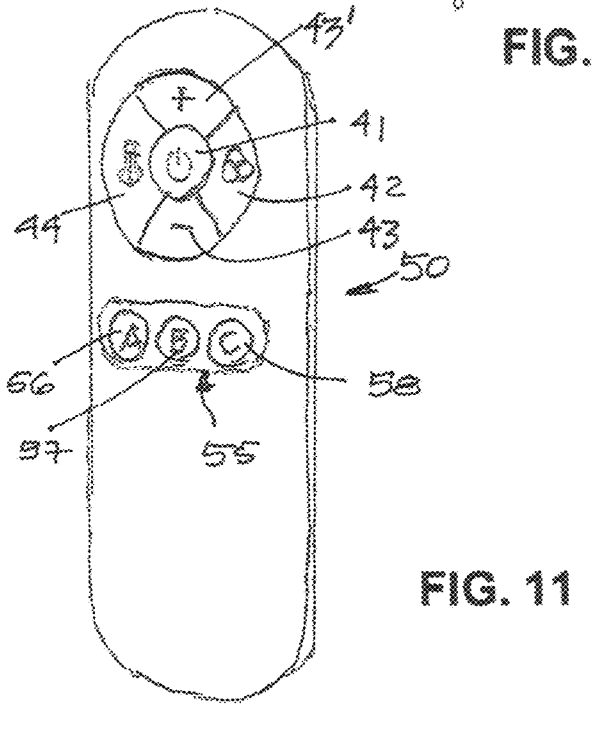
FIG. 11 is a further perspective view of the remote control device of FIG. 8 and provided with an additional selection switches to communicate with more than one control command module and their lighting unit(s) and within the frequency range of the control device.

The control command module 10 is further provided with a manual switch control assembly 22 on the front face 12 thereof to permit and facilitate a user person to effect various controls of the LED lighting unit 23, such as the type shown in FIG. 11, and which incorporates different sets of LED's, herein one or more sets of white LED's and sets of color LED's having LED's of different known color. In this particular embodiment the lighting unit 23 is fitted with white LED's producing white light and RGB LED's which can produce red, green and blue light, respectively, or different light colors by combining different colors together. A single electrical cable 24 containing wiring therein provides the operating current to operate individual ones of the sets of LED's. The cable 24 is the only physical connection between the light control command module 10 and the LED lighting unit 23. The cable exits the light control module 10 through a small hole 25 in the rear of the top wall 26 of the housing 17 and is relatively small in diameter to provide minimal visibility. The cable 24 may be provided with connectors at opposed ends and wherein a connector is provided in the top wall 17 of the command module. Such would make it possible to have cables of different lengths to permit installations wherein the accessible electrical outlet is at a distance which is more remote from the installation of the lighting unit.

Figure 13:
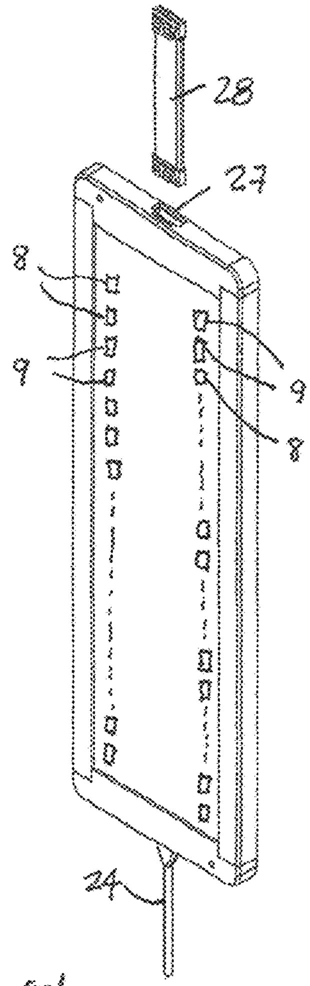
FIG. 13 is a perspective, partly exploded, view of a flat LED light unit incorporating color LED's of different colors, such as RGB LED's, and white light LED's and showing a jumper cable to interconnect the lighting unit to other like LED lighting units.

As shown in FIG. 13, the LED lighting unit 23 is of a flat construction making it least visible when mounted on a wall surface, such as the bottom wall 14 of the cabinets 15, shown in FIG. 1. The white and color LED's, 8 and 9, are also mounted in an alternating pattern whereby to project a uniform light on an area to be illuminated. Instead of a lighting unit as shown in FIG. 13, the lighting unit may consist of LED light strips secured to the under surface 14', or puck shape LED lamps or other configurations of LED lighting units. As also shown in FIG. 13, the LED lighting unit has a wire connector 27 mounted in an end wall thereof to receive a flat wire jumper strip 28, provided with end connectors 28', to permit the LED lighting unit 23 to be serially connected to further LED lighting units 23 whereby two or more of these LED lighting units may be controlled at the same time by the control command module to produce like light as selected by a user person operating the different switches of the control switch assembly 22. Mounting two or more lighting units 23 provides in substantially close relationship projects light which is uniform with no interruptions in the projected light With reference to FIGS. 4 to 7, the light control command module 10 is further provided with a communication module connecting port 30, recessed in a side wall 31. The module connecting port has an electrical connector 32 mounted in a rear wall 33 thereof whereby to electrically connect to a connector 34 of the communication module 36 and projecting from a rear wall 35 of the module. The communication module is also provided with communication software, not shown but obvious to a person skilled in the art, to permit remote control of the LED light unit 23 through the command module, while the manual control by the switch assembly 22 is maintained for local operation. The connector 32 could also be mounted on the side wall 31 instead of being mounted in a recessed cavity formed therein. However, the recessed cavity is preferred for the reason that the communication module is less apparent and provides for a more eye pleasing command module. The other side wall 37 of the control module 10 is provided with one or more 120 VAC electrical receptacles 38 to provide power to other electrical devices which may require electrical power and located close-by such as a toaster, coffee brewing machine, usually on a kitchen counter top. Accordingly, the utility of the electrical receptacle is maintained, although occupied by the control command module of the present invention. Also, the control command module may also provide in its side wall 37, one or more USB charging ports 39, to charge devices such as iphones, etc.

Figure 4:
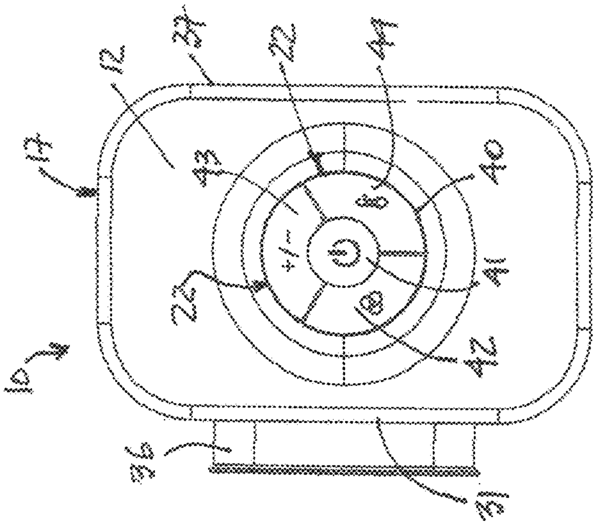
FIG. 4 is a front view of FIG. 1.
Figure 5:
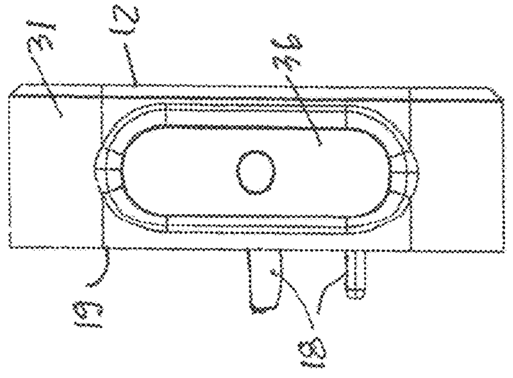
FIG. 5 is a left side view of FIG. 4 showing a communication component secured in a connecting port of the control command module.
Figure 6:
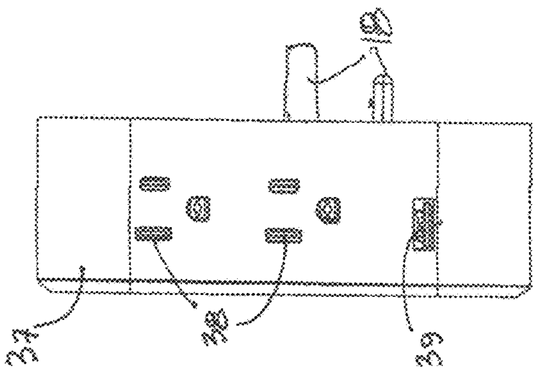
FIG. 6 is a right side view of FIG. 4 showing two electrical receptacles and a USB port provided in the opposed side wall of the control module to provide electrical connection to other electrical devices.
Figure 7:
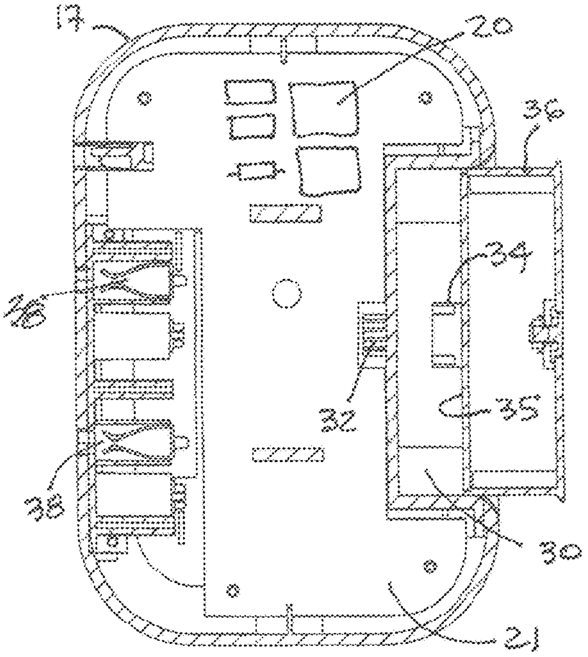
FIG. 7 is a cross-section view of the control command module showing the internal configuration thereof to accommodate the communication component connecting port, two 120 VAC electrical outlets and provides for the mounting of a printed circuit board on which is mounted a circuitry on which is mounted a microcontroller and associated electrical connections and electronics components.

As shown in FIG. 4, the switch control assembly 22 is comprised of four different press-button switches assembled within a large circular pattern 40 and comprised by a first central "on/off" switch 41 with three switch segments 42, 43 and 44 mounted thereabout. A second of the switch segments is a light intensity control switch 43 which when pulsated by the finger, on one side thereof, causes the light intensity to increase and when pulsating on the opposite side, causes the light intensity to decrease and thereby adjusting the brightness of selected ones of the LED's to project a colored or white light. A third of the switch segments 44 is a white light LED selection switch which when pulsated cause the white light to change color temperature from bright daylight, to a warm sunset glow to synchronize the light tone to follow a person's natural circadian rhythm and thereby help a person to improve sleep, energy, and general well-being. A fourth of the switch segments 42 is a colored light selection switch, adapted to cycle through different pre-set colors. By finger pulsing the switch 42 the user person can cycle through each of the color LED's. The intensity of the selected color produced by the RGB LED's, is then adjusted by the use of the brightness control switch 43. These pre-set color temperatures of the white light LED's, and the different output colors of the RGB LED's, are programmed in the memory of the microcontroller.

To produce purely blue light, the microcontroller would be programmed to cause the driver circuits to set the blue LED's to the highest intensity and the green and red LED's to the lowest intensity. To produce other colors, one can combine the three colors in different intensities. In the specific embodiment of the switch controls provided by switch segments 42, 43 and 44, by pulsating these switches, the user person cycles through pre-set programmed controls of the RGB colors. The brightness control switch 44 provides for the user person to adjust the brightness of the selected resultant light at pre-set settings of 10%, 30%, 50%, 70% and 100%. The white light selection switch 44, when pulsated, causes adjustment of the color temperature of the white light to pre-set tones from color temperatures of 4000K, 3000K, 2500K and 2000K. Finally, the color selection switch 42 when pulsated establishes connection to each of the three colored sets of LED's pre-set to produce resultant light colors of red, green, blue, pink, orange, cyan and purple colored lighting. It is pointed out that by the use of the word "pre-set" it is intended to also mean "programmed in the memory of the microcontroller.

As shown in FIG. 13, the color LED's 8 may be positioned along opposed edges of the LED lighting unit 23 with alternating colored LED's. White light LED's 9 may be disposed between the three different color LED's 8. The color LED's herein illustrated are RGB LED lamps but individual color LED's may also be utilized in the lighting unit construction. Each of the three sets of different color LED's is selectively connected to a supply voltage from a driver circuit, not shown but obvious to a person skilled in the art, and responsive to the selected color LED selected by the user person operating the push-button selection switch 42. Each time the selection switch 42 is depressed, a connection is established to a different one of the pre-set colors causing the microcontroller to have the driver circuits operate the color LED's to produce the selected light color. Therefore, the user person can select any one of several pre-set colors to produce a desired colored lit environment. By using the light intensity control switch 43 the user person can then adjust the brightness of the colored light projected by the lighting unit. If it is desired to produce purely red light, for example, to create a festive ambiance such as at Christmas time, the user person you'd select the red sets of LED's by depressing the selection switch 42 until the red LED set is lit, and which is pre-set at a certain intensity and then by adjusting the brightness, by the use of the switch 43, the light intensity is adjusted which causes a modification to the tone of the selected light color. When combination of color LED lights are selected, for example to generate a purple color the microcontroller is programmed to turn on the blue and red LED's and this produces a shade of purple called magenta. Similarly, combining blue and green gives cyan colors. Because the colored LED's are mounted very close to each other, our eyes see the result of the combination of colors, rather than the individual colors.

To produce white light, the user person would depress the white light tunable selection switch 44 which engages the white light LED's 8 in the lighting unit 23. By pulsing the push-button switch 44 user person cycles through the pre-settings of the color temperatures of the white light LED's, herein programmed to four different white light color temperatures of 4000K, 3000K, 2500K and 2000K whereby the tone of the white light is modified between a bright natural white light down to a warm yellowish light.

Figure 8:
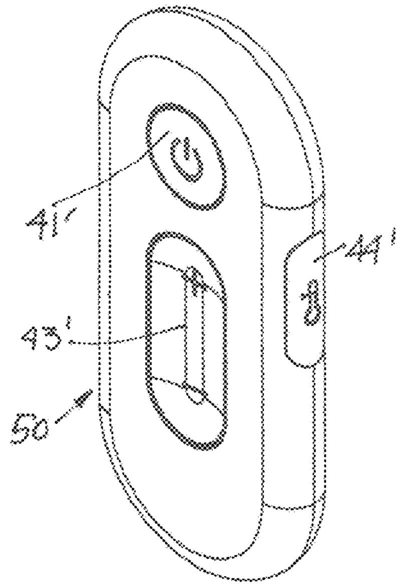
FIG. 8 is a perspective view of an example of a remote control device for communicating within an RF frequency communication module when secured in the communication component connecting port of the control command module.
Figure 10:
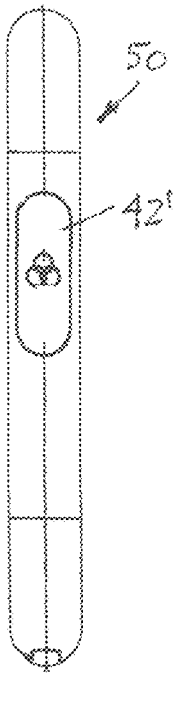
FIG. 10 is a left side view of FIG. 8.
Figure 9:
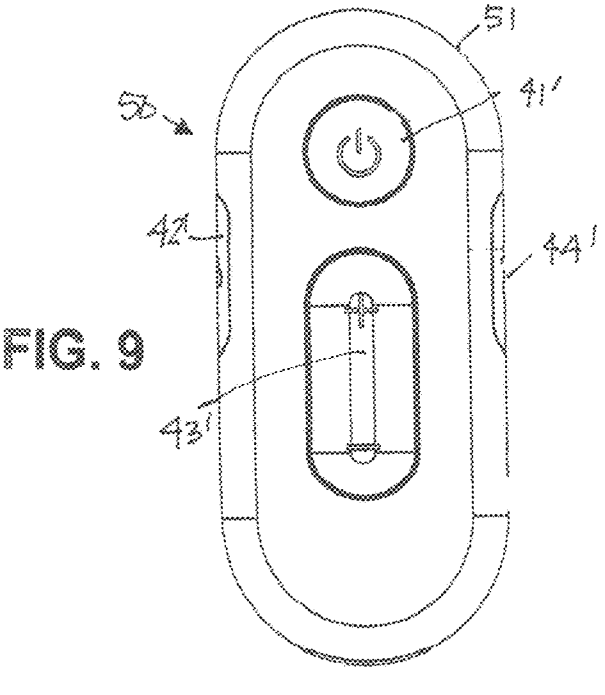
FIG. 9 is a front view of FIG. 8.

With reference now to FIGS. 1 to 10, there will be described the remote feature of the light control command module 10. When a communication module 36 is inserted into the communication component port 30, the user person can now remotely control the LED lighting unit wirelessly through the control command module 10. Such a remote control module is provided together with a control device 50, as shown in FIGS. 8 to 10, to control the lighting unit(s) through the control command module 10 and within a particular RF frequency range of the communication module. The control device 50 is comprised of a hand held housing 51 of suitable shape, which is comfortable to the hand of a user person, and provided with four distinct switch buttons 41', 42', 43' and 44' to perform the same functions as their corresponding manual press-button switches 41, 42, 43 and 44 as above described with reference to the manual switch assembly mounted on the light control command module 10.

FIG. 11 illustrates a further modification of the control device 50 wherein there is provided an additional which assembly 55 to permit a user person to independently communicate, by the use of the same control device, with three different control command modules and their associated lighting unit(s) which may be mounted in the same area or different areas where there is RF frequency reception. Such areas are distinguished by switch buttons 56, 57 and 58 which permit identification of the different control command module by the use of different signature frequencies which enables control of the additional control command modules and their associated lighting unit(s). Also, as shown in FIG. 11, the intensity selection switch can be constructed in two separate switch segments, namely segments 43 and 43", with one press-button switch 43 to reduce the light intensity and the other press-button switch 43' to increase the light intensity.

Figure 12:
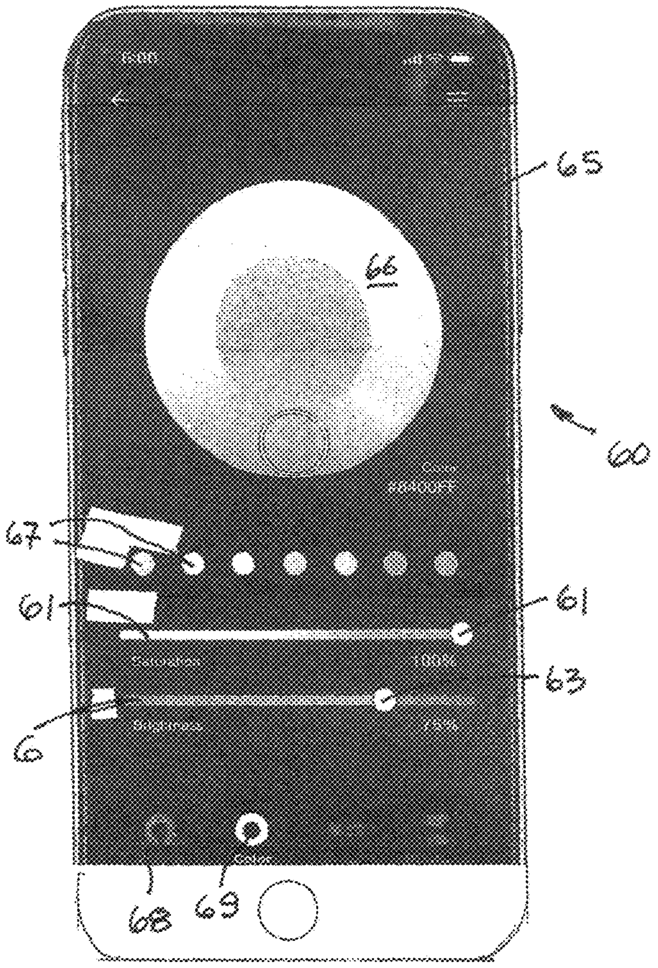
FIG. 12 is a front view of an iphone provided with an app to communicate with a smart control module inserted into the communication port of the control command module an provided with icons to control the white and color LED's of the lighting unit(s)

FIG. 12 illustrates another communication module 36 which permits remote control of the LED lighting unit 23, through the light control command module 10, by a smart control device, such as an iphone in which an app is downloaded to perform the control functions of the command module The iphone or other smart device communicates with the communication module 36 through the internet, Ethernet, or other wireless transmission medium. The microcontroller is also programmed to recognize the connection of the smart communication module and to perform different control functions of the LED's responsive to the signals received and generated by the controls provided by the app and displayed on the screen of the smart control wireless electronic devices.

As illustrated by FIG. 12, the smart control device is an iphone 60 provided with an application to permit operation of the lighting unit(s) remotely through the control command module. Selection switch icons 68 and 69 enables the white and colored LED's control mode features. Cursors 61 and 63 provide for continuous selection of white color temperatures and colored light selections produced by RGB LED's and including color combinations thereof. By the use of sliding a finger over a cursor button 61, a series of lights 67 displays the color changes at the positions of the cursor 61 as it is displaced by the finger of the user person. The app further displays button icons 68 and 69 to select between the white light adjustment or the colored light adjustment modes. When in the white light selection mode, button icon 69, or the shade, namely the CCT color temperature, of white light can be selected by cursor 61 and its intensity can be adjusted by cursor 63. By depressing the button icon 68 the color can be selected by cursor 61 and its intensity adjusted by cursor 63. The cursor 63 permits adjustment up to 100% of the light intensity and such is displayed by the large icon 66 on the screen 65 of the smart phone which provides a display of the selected light and its intensity adjustments.

The method of controlling an LED lighting unit will now be briefly described. As described above, the lighting unit(s) 13 is provided with white and colored LED's to illuminate an area with white light of an adjustable tone and intensity and colored light of a desired selected color and intensity and selected and controlled by a user person through the use of the control command module 10. The user person install the lighting unit on a surface adjacent an area to be illuminated and wherein an electrical receptacle is accessible. The cable 24 may also be extended if the receptacle is further than the cable provided. After securing the cable to the lighting unit, the control command module is plugged into the electrical receptacle and the installation is complete. The user person can now control the LED light unit by the function switches mounted on the front face of the command module. This is accomplished by the user person firstly depressing the "on/off" press-button switch 41 to connect the control command module to electrical power from the electrical receptacle to feed supply voltage to the circuitry in the control command module. If the user person wishes to project white light in the area to be illuminated, the white light function switch 44 is depressed and pulsated until a desired tone of the white light is projected by the lighting unit. Once selected, the user person then operates the light intensity switch 43 to adjust the intensity of the selected white light tone. If the user person wishes to project a colored light in the area to be illuminated, then it depresses the colored light function switch 42 and by pulsating the press-button switch different colored light are projected by the lighting unit. After selection of the desired colored light, the user person then operates the light intensity switch 43 by pulsating it until a desired light intensity is projected by the lighting unit.

The light control command module and lighting unit is provided in a modular kit form with different elements from a simple modular assembly consisting of a control command module and a lighting unit or alternatively with a remote module and remote control or with a smart module for wireless operation by the use of smart electronic wireless devices in which an app is downloaded to communicate with the microcontroller of the command module through the internet or wirelessly. The kit may also be provided with different cable lengths depending on the intended use and installation of the modular kit.

It is within the ambit of the present invention to cover any obvious modifications of the embodiment described herein provided such modifications fall within the scope of the appended claims.

What is claimed is:

1. A multi-function, electrical receptacle mounted, LED light control command module comprising a housing having electrical connectors in a rear wall thereof for mounting support of said control command module in an electrical receptacle to connect said control command module to a supply voltage to provide voltage to circuitry and components mounted is said housing, an electrical cable interconnecting said control command module to an LED lighting unit having white LED's to produce white light and color LED's to produce colored light, said circuitry including a microcontroller to operate drivers to supply drive current to said LED's, said control command module having switches mounted thereon to perform switch functions comprised of:

(i) a first "on/off" switch to connect said supply voltage from said electrical receptacle to said circuitry and components including said microcontroller to operate said LED's in said LED lighting unit;

(ii) a second switch to adjust the brightness of light generated by said LED's;

(iii) a third switch to select white LED's to generate white light of a desired tone;

(iv) a fourth switch to select color LED's producing a desired colored light, and wherein said second switch is operable to adjust the brightness of a resultant light produced by said selected one of said white or colored LED's.

2. The multi-functional, electrical receptacle mounted, LED light control command module as claimed in claim 1 wherein said lighting unit includes a first set of LED's producing said white light and a second set of LED's producing said colored light, said electrical cable having supply wires to provide drive current to each said sets of LED's producing said desired tone of said white light and at least said selected LED's producing colored light.

3. The multi-functional, electrical receptacle mounted, LED light control command module as claimed in claim 2 wherein said LED's of a desired colored light are RGB LED's capable of producing red, green and blue light or a different colored light from different combinations of red, green and blue light producing LED's.

4. The multi-functional, electrical receptacle mounted, LED light control command module as claimed in claim 1 wherein said control command module is further provided with a communication module connecting port adapted to optionally receive a communication module to permit remote control of said LED's in said lighting unit by remote operation of said control command module while maintaining manual operation of said lighting unit through said switches mounted on said control command module.

5. The multi-functional, electrical receptacle mounted, LED light control command module as claimed in claim 4 wherein there are two of said communication modules to operate said lighting unit through said control command module, one of said communication module being a remote control module having a remote control device provided with press-button switches having like switch functions as said switches mounted on said control command module and operable wirelessly from a short range of said control command module, and the other of said communication module being a smart control module to permit control of said lighting unit through said control command module by smart electronic wireless devices having downloaded therein an application to permit operation of said lighting unit remotely via the internet or wirelessly from a distance.

6. The multi-functional, electrical receptacle mounted, LED light control command module as claimed in claim 1 wherein said second, third and fourth switch controls are press-button selection switches permitting light selection of white and colored light and selection functions by a predetermined number of switch depressions of said switches to cycle through preset selections of color temperature of said white light and different colors produced by said colored LED's.

7. The multi-functional, electrical receptacle mounted, LED light control command module as claimed in claim 3 wherein said third selection switch is a press-button selection switch which when actuated a predetermined number of depression automatically causes said microcontroller to instruct said driver circuits to supply the necessary drive current to change the color temperature of said white LED's to predetermined color temperature increments corresponding to said switch depressions and within the CCT color temperature range of about 2000K (Kelvin) to 5000K (Kelvin) to change the tone of said white light.

8. The multi-functional, electrical receptacle mounted, LED light control command module as claimed in claim 7 wherein said increments are pre-set at 4000K, 3000K, 2500K and 2000K temperatures whereby the tone of said white light is modified between a bright natural white light down to a warm yellowish light at four different color temperature selections corresponding to four switch depressions.

9. The multi-functional, electrical receptacle mounted, LED light control command module as claimed in claim 3 wherein said switches are push-button switches, said second, third and fourth switches being tunable press-button switches adapted to cycle through pre-set switch functions by finger pulsing said push button switches to cycle through different ones of said switch functions, said third press-button switch providing for selection of a desired tone of white light, said fourth press-button switch providing for selection of a desired colored light, and said second press-button switch providing for adjustments of the intensity of said selected white tone white light or said colored light.

10. The multi-functional, electrical receptacle mounted, LED light control command module as claimed in claim 5 wherein said remote control module when inserted into said module connecting port becomes electrically coupled to said control command module permitting said microcontroller in said control command module to be remotely controlled by a remote control device provided with finger actuating switches to permit the same switch functions as said first, second, third and fourth switches of said control command module.

11. The multi-functional, electrical receptacle mounted, LED light control command module as claimed in claim 10 wherein said remote control device is a hand held control device permitting wireless communication within an RF frequency range.

12. The multi-functional, electrical receptacle mounted, LED light control command module as claimed in claim 10 wherein said remote control device is provided with additional selection switches to communicate and control other control command modules within the communication range of said remote control device, said other control command modules being connectable to said remote control device through a signature frequency signal associated with said additional selection switches.

13. The multi-functional, electrical receptacle mounted, LED light control command module as claimed in claim 10 wherein said module connecting port is a cavity port formed in a side wall of said control command module and having an electrical connector secured therein for electrical coupling with an electrical connector of said communication module to provide for said control command module to be remotely controlled while maintaining manual control by operation of said first, second, third and fourth switches on said control command module.

14. The multi-functional, electrical receptacle mounted, LED light control command module as claimed in claim 5 wherein said smart control command module when inserted into said module connecting port becomes electrically coupled to said control command module to establish communication with said smart electronic wireless device.

15. The multi-functional, electrical receptacle mounted, LED light control command module as claimed in claim 1 wherein said housing is further provided with at least one 120 VAC electrical receptacle in an accessible wall section thereof to provide supply voltage to other electrical devices.

16. The multi-functional, electrical receptacle mounted, LED light control command module as claimed in claim 15 wherein said housing is of substantially rectangular shape and defines a top, bottom and opposed side walls; and wherein said at least one electrical receptacle is mounted in one of said opposed side walls, the other of said opposed side walls having a module connecting port therein.

17. The multi-functional, electrical receptacle mounted, LED light control command module as claimed in claim 16 wherein said one of said opposed side walls is further provided with a USB charging port.

18. The multi-functional, electrical receptacle mounted, LED light control command module as claimed in claim 1 wherein said electrical receptacle is mounted on a wall surface and wherein said LED lighting unit is mounted on an under surface of an object to project light on a surface spaced therebelow.

19. The multi-functional, electrical receptacle mounted, LED light control command module as claimed in claim 18 wherein said LED lighting unit is a flat light unit adapted to be substantially concealed from view and mounted on said under surface of cabinets.

20. The multi-functional, electrical receptacle mounted, LED light control command module as claimed in claim 18 wherein said LED lighting unit is one of an LED light strip, a flat panel LED lighting unit and a puck light unit each of which contains at least three color LED's generating red, green and blue light to create a selective light color and a white light LED set, and wherein two or more of said light units are adapted to be serially electrically connected on one another.

21. The multi-functional, electrical receptacle mounted, LED light control command module as claimed in claim 14 wherein said smart control device is provided with two selection button icon displays to select enabling control of said white or color LED's, and a first and a second slide cursor display, and when said white light adjustment selection button is selected by a user person said first slide cursor is displaced by finger sliding to adjust the shade of said white light produced by said white LED's, and when said color light adjustment selection button is selected by said user person said first slide cursor is displaced by finger sliding to select a desire color displayed on said smart control device and by finger sliding the second cursor the intensity of said selected color is adjusted to a desired brightness.

22. The multi-functional, electrical receptacle mounted, LED light control command module as claimed in claim 1 wherein said switch functions are comprised by said first, second and fourth switches, said fourth switch operating RGB LED's, said fourth switch being operable to combine red, green and blue LED's in different intensities to produce a resultant light color or in equal intensities to produce white light, said second switch being operable to adjust the intensity of said resultant light.

23. The multi-functional, electrical receptacle mounted, LED light control command module as claimed in claim 9 wherein said press-button switches are integrated into a circular switch control formed of finger actuating switch segments associated with said first, second, third and fourth switches, said second, third and fourth switch segments being disposed about a central circular switch segment corresponding to said first switch.

24. A method of controlling an LED lighting unit provided with white and colored LED's to illuminate an area and wherein said white and colored LED's are independently controlled to adjust the color temperature of said white light and select a desired color produced by said color LED's and to adjust the intensity of a resultant selected light to create a desired lit environment, said method comprising the steps of:

i) providing a multi-function, electrical receptacle mountable, LED light control command module having function switches mounted thereon to permit control of said LED's mounted in said lighting unit, said control command module having electrical connectors for mounting in an electrical receptacle;

ii) mounting said lighting unit at a location to illuminate an adjacent area;

iii) mounting said control command module in an accessible electrical receptacle in proximity to said lighting unit;

iv) operating an on/off switch of said function switches to connect said control command module to electrical power from said electrical receptacle to feed supply voltage to circuitry including a microcontroller mounted in said control command module;

v) operating a white light or a colored light function switch to produce white light of a desired tone or colored light of a desired color; and vi) operating a brightness adjustment selection switch to adjust the intensity of a resultant white light or a selected colored light.

25. The method as claimed in claim 24 wherein said function switches are press-button function switches, said step of operating said white light function switch comprise depressing said white light function switch to provide drive current to said white LED's, and further depressing said white light function switch to cycle through and select a pre-set colored temperature of said white light.

26. The method according to claim 24 wherein said function switches are press-button function switches, said step of operating said colored light function switch comprises depressing said colored light function switch to provide drive current to said colored LED's and further depressing said colored light function switch to cycle through and select a pre-set light color provided by said of different color LED's or combinations of said colored LED's.

27. The method as claimed in claim 24 wherein said brightness adjustment selection switch is a press-button switch and wherein said step (iv) further comprises the step of depressing said brightness adjustment selection switch a predetermined number of times to cycle through pre-set light intensity adjustments to control the brightness of said resultant light generated by the adjustments to the LED's.

28. The method as claimed in claim 24 wherein said control command module is provided with a communication module connecting port and wherein there is further provided the steps of inserting a remote control module in said communication module connecting port, and providing a remote control device to perform said steps (v) and (vi) by like function switches on said remote control device as those provided on said control command module, said remote control device operating within an RF frequency range.

29. The method as claimed in claim 28 wherein said remote control device is further provided with additional selection switches to communicate and control other control command modules associated with other lighting units and within the RF communication range of said remote control device.

30. The method as claimed in claim 24 wherein said control command module is provided with a communication module connecting port and wherein there is further provided the steps of inserting a smart control module in said connecting port to establish communication with smart electronic wireless devices to perform said steps (iv), (v) and (vi) by the use of an application downloaded in said smart electronic wireless devices.

* * * * *